Dec. 29, 1970 E. D. SMITH 3,551,781

TRANSIENT VOLTAGE SUPPRESSION CIRCUIT

Filed June 26, 1969

INVENTOR.

Earl D. Smith

BY

C. L. Meland

ATTORNEY

United States Patent Office 3,551,781
Patented Dec. 29, 1970

3,551,781
TRANSIENT VOLTAGE SUPPRESSION CIRCUIT
Earl D. Smith, Naperville, Ill., assignor to General Motors Corporation, Detroit, Mich., a corporation of Delaware
Filed June 26, 1969, Ser. No. 836,839
Int. Cl. H02m 1/18
U.S. Cl. 321—11                                    8 Claims

ABSTRACT OF THE DISCLOSURE

A full-wave bridge for rectifying alternating current polyphase energy from a source and coupling the resulting direct current to a load. Steering diodes and selenium devices for diverting load and source transient voltages from the rectifying devices are provided to prevent such transients from damaging the devices that form the bridge or alter their control of the energy to the load.

---

This invention relates to means for protecting elements comprising a polyphase rectifier from the effects of transient voltages in the source or load.

BACKGROUND

Rectifier bridges used for converting AC polyphase source power to DC load power are comprised of a rectifying circuit for each phase, and each such circuit is usually comprised of two unidirectional current conducting elements. Since positive-going transients across these elements could cause conduction where none is desired and negative-going transients could damage the elements, it is desirable to provide each rectifying circuit with means to suppress transients. It has been proposed to protect the rectifying circuit again positive and negative going transients by providing pairs of suppressors connected across the circuit being thereby protected. For instance, in a three phase system, a pair of suppressors has been connected between each of the three phases to protect from transients in the source, and another suppressor has been used to protect from transients in the load. In addition to these sets of suppressors, where the load was inductive and the rectifying circuit included a controllable rectifying device, a low impedance path in the form of a "free wheeling" diode was conventionally connected across the load as disclosed in the patent to Reilly et al. 2,476,911 to prevent voltages induced in the load when switching off a controllable rectifier from adversely affecting the operation of the rectifying circuit. This diode also had to be protected against the effects of negative-going load transients.

Typical of some of such previous protective measures as have been described are those shown in the patent to Greening et al. 3,332,000. There, the individual sets of voltage suppressors are connected across each AC input line and are comprised of stacks of selenium cells. Such cells quickly attenuate large reverse voltages to clamping levels and also recover and "heal" their junctions thereafter. However, the leakage currents of such selenium cells are relatively unstable with age and varying junction temperatures. They become even more of a problem as the current densities per cell are increased by attempting to minimize the total size and cost of the suppressors. Since each cell can withstand from 25 to 32 volts of inverse potential before breakdown, the number of cells, and hence the size of the stack comprising the suppressor, could be minimized by designing each cell to attain the upper voltage level. Unfortunately, transients across these suppressors would then often produce enough of a temperature rise at the junctions so that the leakage currents and the junction temperatures regeneratively increased to where a suppressor would be continuously broken down. Such suppressors would, therefore, have poor reliability and often be ineffective in controlling the load voltage of protecting against transients unless they were adequately cooled, which in turn required greater space.

The present invention reduces the number of selenium suppressors required for protection and avoids the problem of leakage current instability while at the same time protecting the rectifier bridge and also the free-wheeling diode from the effects of transients both from the source and the load. This is accomplished by means of a suppressor circuit comprised of a small inexpensive steering diode for each source line and another similar steering diode for a load line. These diodes feed transients from both the source lines and load to a single suppression element. The breakover voltage of this suppressor is chosen to be greater than the normal peak line voltage from the source but less than the reverse voltage ratings of the steering diodes and the bridge elements. Moreover, by using a selenium suppressor, transients between these two voltages will not affect the proper operation of a rectifier that has controllable periods of conduction in each cycle, for example, where some of the devices of the bridge are controlled rectifiers.

Connection of this single suppressor permits the use of an element that is just slightly larger than the plurality of suppressors required by the prior art. Part of the small increase in size is to provide added capacity for holding off the three phases of the source rather than just one phase as in the prior art, and the other part of the increase is to provide lower current densities and larger cooling surfaces so that the problem of leakage current instability is avoided.

Accordingly, the primary object of the present invention is to provide a means for protecting the bridge elements of a polyphase rectifier from the effects of transient voltages in the load and source by means that are more effective, reliable, and economical than those heretofore known.

Another object of this invention is to provide such protection in a manner comparatively insensitive to changes in the leakage current characteristics of the protection means.

Another object of this invention is to provide transient voltage protection means for a bridge rectifier that includes controllable devices such as controlled rectifiers, that allow control of conduction through the controllable rectifier circuits to be maintained in the presence of transients.

Another object is to provide switching transient protection means for a bridge rectifier feeding an inductive load wherein the system includes a free wheeling diode and wherein the protection circuit is operable to protect the diode and bridge elements from load transients.

A further objective is to provide cooperative protection means part of which break down in the presence of source or load transients and another part of which break down in the presence of just load transients.

These and other objects may be further appreciated from the following drawings and descriptions wherein.

Figure 1:
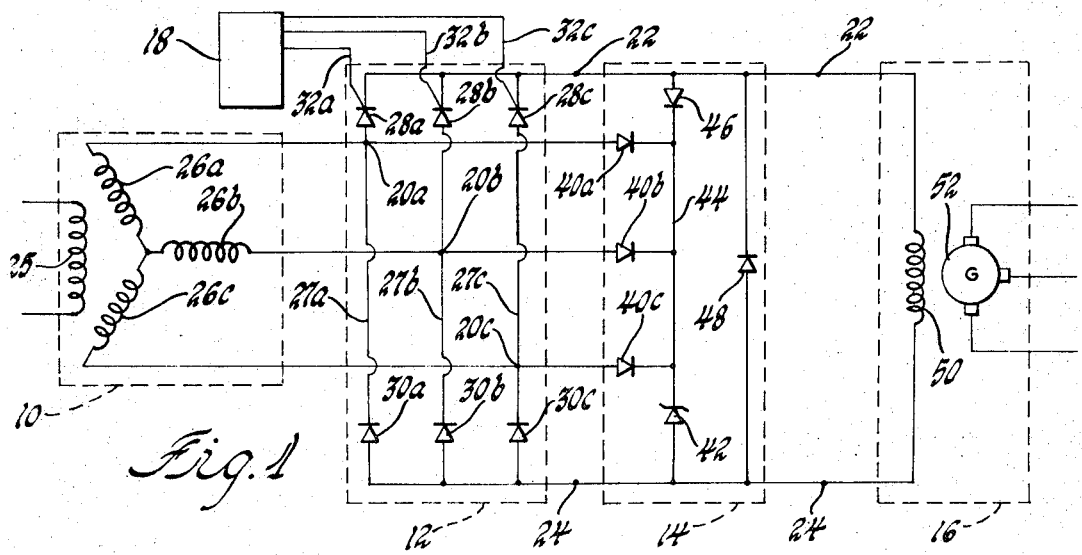
FIG. 1 is a schematic circuit diagram of the preferred embodiment of the invention wherein a bridge circuit feeds a load and wherein the elements of the bridge are protected by the voltage suppression circuit of this invention.

With reference to FIG. 1, the preferred embodiment of the invention comprises a source 10 of alternating-current three-phase energy connected to a direct-current load 16 through bridge rectifier 12 and transient voltage protection circuit 14.

The source of alternating current 10 takes the form of an alternating current generator having a field winding 25 connected with a source of direct current (not illustrated) and an output winding comprised of Y-connected phase windings 26a, 26b, and 26c. In the embodiment to be described, the generator is an accessory alternator for a diesel-electric locomotive and in such application may supply 220 volt 80 amp power for use in energizing the field of a main power alternator as is more fully described hereinafter.

The bridge rectifier 12 is comprised of AC input terminals 20a, 20b and 20c; direct current output conductors 22 and 24; and rectifying legs or circuits 27a, 27b, and 27c. AC terminals 20 are connected directly to the respective phase windings 26a, 26b and 26c, and DC power supply conductors or terminals 22 and 24 are connected directly to the load 16.

The three rectifying circuits 27 connected between DC conductors or terminals 22 and 24 correspond in number to the number of phases of the source 10. Each such circuit, moreover, includes two unidirectional current conducting devices 28 and 30 connected in series across terminals 22 and 24. Either or both of such devices could be P-N semiconductors from the group including germanium and silicon so that the rectifier bridge 12 could be of the known six-diode form. However, in the preferred case, each such circuit 27 is comprised of a controllable unidirectional current conducting device 28 connected in series with an uncontrollable unidirectional conducting device 30, and the three circuits 27 cooperate to provide the required DC current to the load 16.

Controllable device 28 in this case is a silicon controlled rectifier, the gate of which is controlled through conductor 32 from a conventional firing circuit 18 that controls the firing angle of the SCR to maintain the proper phase sequence and phase relationship between the line voltages from the source. The SCR's 28 are selected to have a current rating of 80 amperes, a maximum steady state reverse voltage rating of 800 volts, and a transient reverse voltage rating of an additional 150 volts. Such characteristics have been found obtainable from International Rectifier's controlled rectifier #151RA80 or Westinghouse's controlled rectifier #260S.

Uncontrollable device 30 in the present embodiment is a silicon diode having current and voltage ratings relatively the same as those of SCR's 28. Such characteristics have been found obtainable from International Rectifier's diode #301UR80 and Westinghouse diode #790S.

The AC terminals 20a, 20b, and 20c are connected with SCR-diode pairs 28a and 30a, 28b and 30b, and 28c and 30c, respectively. The DC output terminal or load conductor 22 is commonly connected with the cathodes of SCR's 28a, 28b, and 28c; and DC terminal 24 is connected with the anodes of diodes 30a, 30b, and 30c. However, the relative positions of SCR's 28 and diodes 30 could be interchanged so that the anodes of SCR's 28 would be commonly connected to DC terminal 24 and the cathodes of diodes 30 connected to the DC terminal 22. Moreover, as previously pointed out, the bridge can be comprised entirely of silicon diodes since the protection system of this invention is as applicable to this type of circuit as it is to one containing controlled rectifiers.

The transient voltage protection circuit 14 of this invention is comprised of unidirectional current conducting devices 40a, 40b, 40c, and 46 connected with unidirectional current conducting device 42 by conductor 44 and unidirectional current conducting device 48 that provides a low impedance path for switching transients.

Unidirectional conducting devices 40a, 40b, and 40c are preferably silicon semiconductor diodes serving as steering diodes. Their anodes are connected to AC terminals 20a, 20b, and 20c respectively, and their cathodes are commonly connected to conductor 44. Devices 40 cooperatively assure that a transient on one of the AC terminals 20a, 20b, or 20c is channeled through only suppressor 42 and is blocked from appearing on either of the two other AC terminals. In this manner, positive transients from the source are diverted from biasing a nonconducting SCR 28 into conduction or from placing a damaging reverse potential across bridge diodes 30. A negative load transient would similarly be directed across diodes 40 and suppressor 42 so that bridge diodes 30 would be protected from damaging reverse potentials.

Unidirectional device 46 is also a silicon steering diode. To assure that a transient on any AC terminal 20 does not short through the load on DC terminal 22, steering diode 46 is connected with its anode directly to DC terminal 22 and its cathode commonly to the cathodes of steering diodes 40a, 40b, and 40c by means of common connector 44. Diode 46, moreover, steers a load transient through suppressor 42 since diodes 40 block such transients from appearing on any of the AC terminals 20. In this manner, positive transients from the load are diverted from biasing a non-conducting SCR into conduction.

Diodes 40 and 46 are selected to be capable of passing up to 80 amperes in a forward direction and withstanding reverse voltages of up to 800 volts while passing reverse currents of up to 12 amperes for a few milliseconds. Such capabilities have been found obtainable from International Rectifier's diode #669262 or Westinghouse's diode #750S, and, as will be further explained below, are selected to be compatible with the current and voltage ratings of bridge devices 28 and 30 on the one hand and with the characteristics of suppressor 42 on the other.

Unidirectional current conducting device 42 is comprised of a selenium rectifier cell utilized to perform three functions. First, it rapidly suppresses transients in the source as they might appear on any of the AC terminals 20. Secondly, it suppresses most such transients without interrupting conduction through a rectifying circuit. And, thirdly, in this case it also suppresses transients caused by the load.

Again from FIG. 1, it may be seen that the anode of suppression device 42 is connected directly to DC terminal 24, and its cathode is commonly connected to cathodes of steering devices 40 and 46 by conductor 44. To be compatible with the current and voltage ratings of the elements comprising the rectifier bridge and protection circuit as will be explained below, reverse breakover current will effectively commence to flow through device 42 when the reverse potential from its cathode to anode is approximately 320 volts. This reverse current, moreover, increases with increasing reverse potential through 750 volts at 15 amperes. It has been found that such characteristics are obtainable from International Rectifier's suppressor #KFLP-12-TBE.

Being a single device and being incorporated in a simple assembly, suppressor 42 is readily mountable on a structure that is suitable for cooling and locatable to be relatively insensitive to the effects of heat being dissipated by other elements of the rectifier circuit or load. Assembly 14 may be mounted remotely from rectifier 12, such as on the housing structure of the load or even the source. The main heat transfer requirement that should be observed is that the structure on which device 42 is mounted has ample surface area and heat sink capacity to keep the environment below the nominal current breakover temperature of 65 degrees C. under expected conditions of operation.

Inasmuch as transient from the load or source may be expected to occur under normal operation, even though infrequently, one important function performed by device 42 in addition to "healing" itself after a transient is to suppress transient voltages larger than that at which reverse current breakdown commences without causing control of conduction to be lost in that part of rectifying circuit 27 conducting at the time of the transient. This feature arises from that characteristic exhibited by certain semiconductor materials such as selenium whereby conduction of current in the reverse direction is controlled to increase from zero at an inherent minimum current breakover voltage to higher values of reverse current at higher values of reverse potential. This characteristic may be defined by a slope, known as the "clamping factor," of the voltage-current breakover curve. This may be determined from two voltages along the curve where the first is the reverse voltage across the device at a specified value of current and the second is the minimum reverse voltage across the device at which reverse current breakover effectively commences.

The clamping factor, in the present application, amply accommodates the reverse voltage ratings of the bridge and steering elements on one hand to the source and load voltages on the other. For instance, in the preferred embodiment of FIG. 1, a "clamping factor" of 2.35 was effected for reverse voltages from 320 to 750 volts across device 42, such voltages being between the 310 volt peak of a 220 volt source line RMS and the 800 volt reverse voltage rating of SCR's 28, bridge diodes 30, and steering diodes 40 and 46. In other words, the range of reverse voltage levels over which device 42 could conduct should have a minimum greater than the peak source voltage and an intermediate voltage-current point at which the largest anticipated transients are attenuated. The voltage at this point should be less than the reverse voltage ratings of SCR's 28, bridge diodes 30, and steering devices 40 and 46, such reverse ratings being chosen in turn to exceed the peak-to-peak of the source voltages (i.e. here a reverse rating of 800 volts for a peak-to-peak of 620 volts). Without maintaining these relationships between the breakdown voltages of the various bridge and steering devices on one hand and suppressor 42 on the other, transients in a line from the source could break down any or all of the blocking diodes. This would not only expose the bridge elements to the very effects which the subject invention is intended to avoid but would also introduce problems associated with shunting the source transients directly through the load, should diode 46 be broken down.

Figure 2:
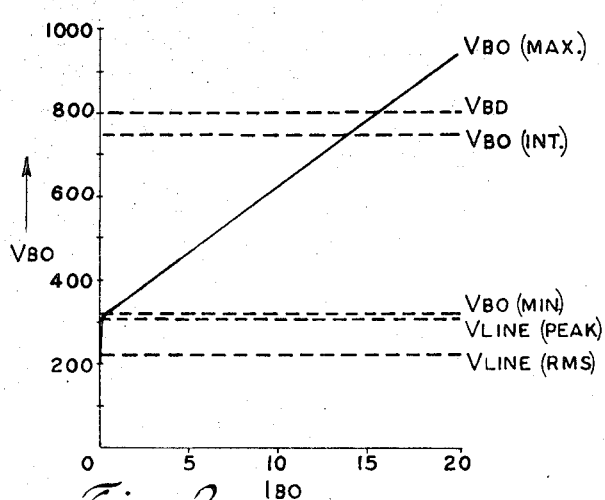
FIG. 2 represents a typical voltage-current characteristic of a selenium suppressor which forms a component part of the voltage suppression circuit of this invention.

The above characteristics and relative voltage levels associated with device 42 may be better understood with reference to a typical voltage-current breakover curve, as shown in FIG. 2. As there illustrated, little or no reverse current flows when the potential across device 42 is less than the minimum breakover voltage, 320 volts in the present application. From this minimum, the breakover voltage and current, increase through and beyond 15 amperes at 750 volts. FIG. 2 also shows these minimum and intermediate breakover points in relation to the peak line voltage, here 310 volts, and the 800 volt breakdown rating $V_{BD}$ of the various bridge and steering elements.

Another aspect important to the proper operation of protection circuit 14 is that impedances in the paths from AC terminals 20 and DC terminal 22 to the cathode of device 42 as well as impedances between the anode of device 42 and DC terminal 24 be kept as small in magnitude as possible. The reason for this is that any unnecessary impedance in a path to suppressor 42 would introduce an I-R drop during the conduction of suppressor 42 that would subtract from the magnitude of the transient that could be suppressed before the reverse ratings of diodes 40 and 46 and in turn the bridge diodes 28 and 30 are exceeded. The anode of device 42 is therefore connected directly to DC terminal 24 and the cathode is connected to DC terminal 22 and AC terminals 20 with only a one diode drop.

Where the load to be supplied is inductive, for example the field winding of a generator, unidirectional current conducting device 48 in the form of a free wheeling diode is connected across the load as shown in FIG. 1. Free wheeling device 48 is here a silicon diode having properties identical to those of bridge diodes 30 and having its anode connected to DC terminal 24 and its cathode to DC terminal 22. One purpose of diode 48 is to provide a low impedance path for the energy built up in the windings associated with an inductive load when the plaths through the load are reversed. Unless an SCR 28 conducting at the time of such a reverseal is shunted by a low impedance path, the reversal transient would be conducted to that SCR from DC terminal 24 and a bridge diode 30. This transient could maintain a forward bias on the SCR and thereby maintain conduction therethrough even after the removal of a gate signal from control circuit 18 on a conductor 32. Another purpose of free wheeling diode 48 is to maintain current flow in the inductive load when a controlled rectifier 28 is switched off, this being an advantage where the inductive load is a field of a generator.

The diode 48 also withstands slight transients in the load by being able to conduct current in the reverse direction for short periods of time. However, in the event of large transients, such as those of 1200 volts for several milliseconds, the reverse capabilities of diode 48 are insufficient, and therefore the alternative path through steering diode 46 and suppressor 42 is required to shunt the otherwise-destructive energy back to the load.

At this point it is observed, as noted above, that free wheeling diode 48, steering diodes 40 and 46 in the protection circuit 14, and bridge elements 28 and 30 in rectifier 12 are able to pass small levels of reverse current for short periods of time before such currents destroy the diodes. Moreover, suppressor 42 could in this invention conduct heavily in the reverse direction without permanent damage. These elements are nevertheless described generically as unidirectional current conducting devices as they are representative of circuit elements that conduct in one direction with much smaller potential drop across their electrodes than when conducting in another direction. For instance, the semiconductor devices used here have forward drops on the order of less than 5 volts when current flows in one direction compared to potential drops in the order of 100's of volts when current flows in another direction.

The subject invention including the commutating diode is also intended to be applicable not only to any DC inductive load that is rectifier-connected to a polyphase source, but also, without the free wheeling diode, to any DC load fed by a polyphase rectifier and capable of experiencing transients. The load 16 can therefore take various forms but in the embodiment described is the field winding 50 of a traction alternator 52 of a diesel-electric locomotive. The field 50 is connected across DC terminals 22 and 24 and provides 300 volt 140 amp field excitation for a three-phase AC generator 52. As indicated previously, DC terminal 22 is commonly connected with the cathodes of SCR's 28, commutating diode 48 and the anode of steering diode 46. Similarly, DC terminal 24 of the load 16 is commonly connected to the anodes of bridge diodes 30, selenium suppressor 42 and commutating diode 48.

OPERATION

Under conditions producing normal load and source voltages, the operation of rectifier bridge is conventional. Thus, assuming the potential of phase winding 26a to be relatively the most positive, 26b zero, and 26c the most negative, current would flow from the Y-connection through winding 26a into AC terminal 20a, through SCR 28a, providing it has been gated on out of rectifier 12 on DC terminal 22, and into field winding 50 of load 16. The path back to the source 10 is completed from the other end of field winding 50, out of the load on DC terminal 24, through bridge diode 30c, and back to the source 10 through AC terminal 20c and phase winding 26c. The "firing angle" portion of the time during which current can be conducted through this path is controlled from circuit 18 through conductor 32a to SCR 28a to in turn control the DC current applied to field 50 of load 16.

In describing the operation of the system in the presence of a positive-going transient in source 10, the voltage relationships described above for normal operation are presumed to prevail again with the exception that a transient voltage is present on winding 26a. This transient would be conducted through steering diode 40a, conductor 44, and transient suppressor 42 of the protective assembly 14. Suppressor 42 would then break down at that current-voltage point on the breakdown characteristic of device 42 that would correspond to the dissipation of the energy in the transient pulse. The path for such dissipation is as before, through DC terminal 24, bridge diode 30c, AC terminal 20c, and winding 26c.

As might be noted from the characteristic shown in FIG. 2, the conduction through suppressor 42 would include only up to 15 amps of the 80 amp source line current. The remaining line current would be channeled through SCR 28a as in normal operation since SCR 28a conducts as long as current flows therethrough during that portion of the cycle effected by gating circuit 18 through conductor circuit 32a. The breakdown of device 42 within the "clamping factor" range, therefore, does not interrupt current to the load.

In the presence of a transient in load 10, as might be caused by a transient in the output of generator 52 prior to blowing fuses or by an open connection to field winding 50, the transient energy would be conducted from load 16 on DC terminal 22 through steering diode 46 to suppressor 42. Suppressor 42 would then break down to that current-voltage combination assuring dissipation of the transient energy. The return path in this case would not be back to the source but rather to the load through DC terminal 24.

ALTERNATIVE EMBODIMENTS

The voltage protection circuit may take other forms which will now be described. In a first variation shown in FIG. 3, a second selenium-type unidirectional current conducting device 43 is connected in series with the first suppressor 42 between the cathode of steering device 46 and conductor 44. In a second alternative embodiment, as may be seen in FIG. 4, an avalanche-type unidirectional conducting device 49 is connected across load input terminals 22 and 24 to replace not only steering diode 46 in the FIG. 1 embodiment, but also any conductor between DC terminal 22 and conductor 44.

Figure 3:
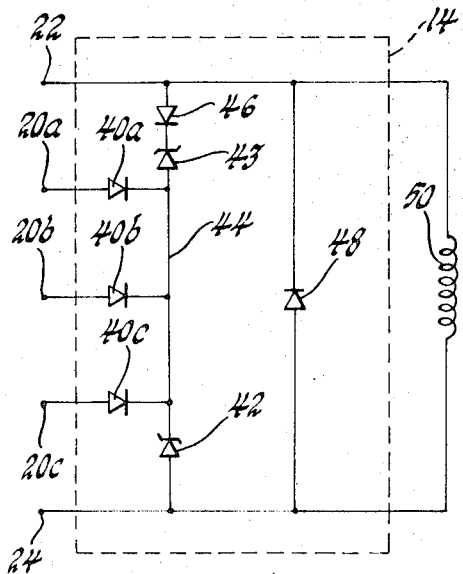
FIG. 3 is a schematic circuit diagram of a modified voltage suppression circuit which can be used to protect the bridge rectifier illustrated in FIG. 1.

With regard to the alternative of FIG. 3, suppression device 43, similar to suppressor 42 previously described, but with fewer cells, is added to the embodiment shown in FIG. 1 with its anode connected to conductor 44 and its cathode to the cathode of diode 46. The FIG. 3 configuration may be desirable to accommodate specific design considerations, for instance where the peak-to-peak of the normal source voltage is selected to approach the reverse voltage ratings of the bridge elements. The minimum breakdown voltage of suppressor 42 may then be selected to be as close to the peak of the source voltage as necessary to provide the needed sensitivity to fluctuations therein. Then, additional suppressor 43 may be connected as shown, for instance to prevent a small load transient from breaking down suppressor 42 and thereby shunting some of the load current to the negative DC bus. Suppressor 43 would in such a case be comprised of as many cells as necessary to provide the desired standoff from the DC load and transients therein.

Figure 4:
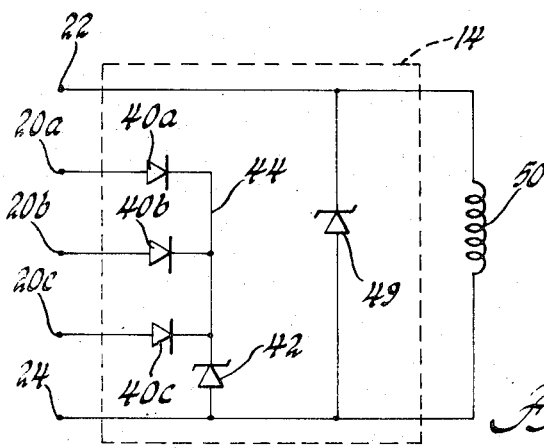
FIG. 4 is a circuit diagram of still another modified voltage suppression circuit that can be used to protect the bridge rectifier of FIG. 1.

In the embodiment of FIG. 4, rectifier device 49, when biased in the forward direction performs the function of free-wheeling diode 48 in the configurations of FIGS. 1 and 3. However, when the bias in the reverse direction exceeds a predetermined breakdown level, rectifier 49 exhibits a negative-resistance voltage-current characteristic allowing a rapidly increasing or "avalanching" current. Element 49 therefore also suppresses load transients in the manner afforded cooperatively by diode 46 and suppressor 42 in FIG. 1. In the presence of a load transient, energy would return to the load 16 on DC terminal 24; and in the presence of a source transient, energy would flow back to the source as in the FIG. 1 configuration, the standoff from the load provided by diode 46 in FIG. 1 being obviated by the lack of any direct connection between conductor 44 and terminal 22. Appropriate avalanche characteristics suitable for device 49 have been found obtainable in General Electric's device #A27C capable of dissipating a 3.9 kilowatts at 12 amps and 400 volts; however, selenium devices similar to device 42 are also suitable.

I claim:
1. An electrical system comprising:
   (a) a source of polyphase alternating current;
   (b) a full wave rectifier circuit having AC input terminals connected with said source of polyphase alternating current and having direct current output terminals connected with direct current load conductors;
   (c) said full wave rectifier being comprised of a plurality of unidirectional conducting devices;
   (d) a direct current load connected with said direct current load conductors;
   (e) a conductor means;
   (f) a plurality of normally nonconductive steering diodes having anodes and cathodes connected respectively with said AC input terminals of said rectifier circuit and said conductor means;
   (g) a normally nonconductive voltage suppressor circuit element having anode and a cathode and a predetermined breakdown voltage therebetween, said breakdown voltage exceeding the normal voltage appearing between said conductor means and one of said direct current load conductors during normal operation of said system;
   (h) and means connecting said suppressor with said conductor means and said one load conductor, whereby one of said steering diodes and said voltage suppressor are rendered conductive by transients developed in said source only when said transients cause the voltage between said conductor means and said one load conductor to exceed said breakdown voltage.

2. The electrical system of claim 1, where said voltage suppression element comprises a selenium rectifier cell.

3. An electrical system comprising:
   (a) a source of polyphase alternating current;
   (b) a full wave rectifier circuit having AC input terminals connected with said source of polyphase alternating current and having direct current output terminals connected with direct current load conductors;
   (c) said full wave rectifier being comprised of a plurality of controllable unidirectional conducting devices and a plurality of uncontrollable unidirectional conducting devices;
   (d) a direct current load connected with said direct current load conductors;
   (e) a conductor means;
   (f) a plurality of normally nonconductive steering diodes having anodes and cathodes connected respectively with said AC input terminals of said rectifier circuit and said conductor means;
   (g) a normally nonconductive voltage suppressor circuit element having an anode and a cathode and a predetermined breakdown voltage therebetween, said breakdown voltage exceeding the normal voltage appearing between said conductor means and one of said direct current load conductors during normal operation of said system;
   (h) and means connecting said suppressor with said conductor means and said one load conductor, whereby one of said steering diodes and said voltage suppressor are rendered conductive by transients developed in said source only when said transients cause the voltage between said conductor means and said one load conductor to exceed said breakdown voltage.

4. An electrical system comprising:
(a) a source of polyphase alternating current;
(b) a full wave rectifier circuit having AC input terminals connected with said source of polyphase alternating current and having direct current output terminals connected with direct current load conductors;
(c) said full wave rectifier being comprised of a plurality of unidirectional conducting devices;
(d) an inductive direct current load connected with said direct load conductors;
(e) a conductor means;
(f) a plurality of normally nonconductive steering diodes having anodes and cathodes connected respectively with said AC input terminals of said rectifier circuit and said conductor means;
(g) a normally nonconductive voltage suppressor circuit element having an anode and a cathode and a predetermined breakdown voltage therebetween, said breakdown voltage exceeding the normal voltage appearing between said conductor means and a first of said direct current load conductors during normal operation of said system;
(h) means connecting said suppressor with said conductor means and said first load conductor, whereby one of said steering diodes and said voltage suppressor are rendered conductive by transients developed in said source only when said transients cause the voltage between said conductor means and said one load conductor to exceed said breakdown voltage;
(i) a free-wheeling device comprised of a selenium rectifier cell having an anode and a cathode and having a predetermined breakdown voltage therebetween greater than the normal maximum voltage appearing between said first and a second of said direct current conductors during normal operation of said system;
(j) and means connecting the anode and cathode of said selenium rectifier cell respectively with said first and second load conductors, whereby said selenium cell is operative to pass current in a forward direction between said first and said second load conductors when voltages are induced in said inductive load and is operative to pass transients in a reverse direction.

5. An electrical system comprising:
(a) a source of polyphase alternating current;
(b) a full wave rectifier circuit having AC input terminals connected with said source of polyphase alternating current and having direct current output terminals connected with direct current load conductors;
(c) said full wave rectifier being comprised of a plurality of unidirectional conducting devices;
(d) a direct current load connected with said direct current load conductors;
(e) a conductor means;
(f) a plurality of normally nonconductive source steering diodes having anodes and cathodes connected respectively with said AC input terminals of said rectifier circuit and said conductor means;
(g) a normally nonconductive load steering diode having an anode and cathode connected respectively with a first of said direct current load conductors and said conductor means;
(h) a normally nonconductive voltage suppressor circuit element having an anode and a cathode and a predetermined breakdown voltage therebetween, said breakdown voltage exceeding the normal voltage appearing between said conductor means and a second of said direct current load conductors during normal operation of said system;
(i) and means connecting said suppressor with said conductor means and said second load conductor, whereby one of said steering diodes and said voltage suppressor are rendered conductive by transients developed in one of said source and said load only when said transients cause the voltage between said conductor means and said second load conductor to exceed said breakdown voltage.

6. An electrical system comprising:
(a) a source of polyphase alternating current;
(b) a full wave rectifier circuit having AC input terminals connected with said source of polyphase alternating current and having direct current output terminals connected with direct current load conductors;
(c) said full wave rectifier being comprised of a plurality of controllable unidirectional conducting devices and a plurality of uncontrollable unidirectional conducting devices;
(d) an inductive direct current load connected with said direct current load conductors;
(e) a conductor means;
(f) a plurality of normally nonconductive source steering diodes having anodes and cathodes connected respectively with said AC input terminals of said rectifier circuit and said conductor means;
(g) a normally nonconductive load steering diode having an anode and cathode connected respectively with a first of said direct current load conductors and said conductor means;
(h) a normally nonconductive voltage suppressor circuit element comprising selenium rectifier cells having an anode and a cathode and a predetermined breakdown voltage therebetween, where said breakdown voltage exceeds the normal voltage appearing between said conductor means and a second of said direct current load conductors during normal operation of said system;
(i) and means connecting said suppressor with said conductor means and said second load conductor, whereby one of said steering diodes and said voltage suppressor are rendered conductive by transients developed in one of said source and said load only when said transients cause the voltage between said conductor means and said second load conductor to exceed said breakdown voltage.

7. An electrical system comprising:
(a) a source of polyphase alternating current;
(b) a full wave rectifier circuit having AC input terminals connected with said source of polyphase alternating current and having direct current output terminals connected with direct current load conductors;
(c) said full wave rectifier being comprised of a plurality of unidirectional conducting devices;
(d) an inductive direct current load connected with said direct current load conductors;
(e) a conductor means;
(f) a plurality of normally nonconductive source steering diodes having anodes and cathodes connected respectively with said AC input terminals of said rectifier circuit and said conductor means;
(g) a normally nonconductive load steering diode having an anode and cathode connected with a first of said direct current load conductors and said conductor means;
(h) a normally nonconductive voltage suppressor circuit element comprising a selenium cell rectifier having an anode and a cathode and a predetermined breakdown voltage therebetween, said breakdown voltage exceeding the normal voltage appearing between said conductor means and a second of said direct current load conductors during normal operation of said system;

(i) and means connecting said suppressor with said conductor means and said second load conductors, whereby one of said steering diodes and said voltage suppressor are rendered conductive by transients developed in one of said source and said load only when said transients cause the voltage between said conductor means and said second load conductor to exceed said breakdown voltage.

8. An electrical system comprising:
(a) a source of polyphase alternating current;
(b) a full wave rectifier circuit having AC input terminals connected with said source of polyphase alternating current and having direct current output terminals connected with first and second direct current load conductors;
(c) said full wave rectifier being comprised of a plurality of unidirectional conducting devices;
(d) a direct current load connected with said direct current load conductors;
(f) a plurality of source steering diodes connected respectively with said AC input terminals of said rectifier circuit and said conductor means;
(g) a load steering diode;
(h) first and second voltage suppressor circuit elements, each having an anode and a cathode and each having a predetermined breakdown voltage therebetween, said breakdown voltages exceeding the normal maximum voltages appearing across said elements during normal operation of said system;
(i) means connecting said first suppressor and said load steering diode in series between said conductor means and said first load conductor;
(j) and means connecting said second suppressor with said conductor means and with said second load conductor, whereby transient voltages developed in said system are transmitted to said voltage suppressors by said steering diodes.

References Cited

UNITED STATES PATENTS

| 3,383,581 | 5/1968 | Rosenberry, Jr. | 322—28X |
| 3,443,200 | 5/1969 | Kuhn | 322—24 |
| 3,469,168 | 9/1969 | Harland, Jr., et al. | 322—28X |

FOREIGN PATENTS

| 534,199 | 10/1955 | Italy | 321—11 |

WILLIAM M. SHOOP, JR., Primary Examiner

U.S. Cl. X.R.

318—345

PO-1050
(5/69)

UNITED STATES PATENT OFFICE
CERTIFICATE OF CORRECTION

Patent No. 3,551,781      Dated February 10, 1971

Inventor(s) Earl D. Smith

It is certified that error appears in the above-identified patent and that said Letters Patent are hereby corrected as shown below:

Column 1, line 34, "again" should be --against--.

Column 4, line 9, "or" should be --and--;
line 74, "transient" should be --transients--.

Column 6, line 10, "plaths" should be -- paths--.

Column 11, line 21, after "conductors;", a new subparagr: should be inserted as follows: --(e) a conduct means;--.

Signed and sealed this 11th day of May 1971.

(SEAL)
Attest:

EDWARD M. FLETCHER, JR.            WILLIAM E. SCHUYLER,
Attesting Officer                     Commissioner of Pat(